C. LE G. FORTESCUE.
CIRCUIT INTERRUPTING DEVICE.
APPLICATION FILED JULY 13, 1914.

1,227,416.

Patented May 22, 1917.

WITNESSES:
Clarence E. Myers
J. A. Procter

INVENTOR
Charles Le G. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTING-HOUSE ELECTRIC AND MANUFACTURING COMPANY, A CORPORATION OF PENNSYLVANIA.

CIRCUIT-INTERRUPTING DEVICE.

1,227,416.  Specification of Letters Patent.  Patented May 22, 1917.

Application filed July 13, 1914. Serial No. 850,744.

*To all whom it may concern:*

Be it known that I, CHARLES LE G. FORTESCUE, a subject of the King of Great Britain and a resident of Pittsburgh, in the county of Allegheny and State of Pennsylvania, have invented a new and useful Improvement in Circuit-Interrupting Devices, of which the following is a specification.

My invention relates to means for automatically interrupting electrical circuits under predetermined conditions.

One object of my invention is to provide an automatic circuit interrupter having no moving parts.

Another object of my invention is to provide a circuit interrupter to protect a circuit from a reversal of the current traversing the same.

Another object of my invention is to provide a circuit interrupter which does not draw an arc when the current traversing the same is interrupted.

It is old in the art to connect a condenser in shunt to a switch for extinguishing an arc when the switch is opened and it is also old in the art to connect a charged condenser in series relation to a switch to quench the arc when the switch is opened.

I provide a mercury-vapor device and a condenser which induces a high-frequency oscillating voltage upon the mercury-vapor device, under predetermined conditions, in order to interrupt the arc in such mercury-vapor device and thus interrupt the circuit in which the mercury-vapor device is connected.

Figure 1:
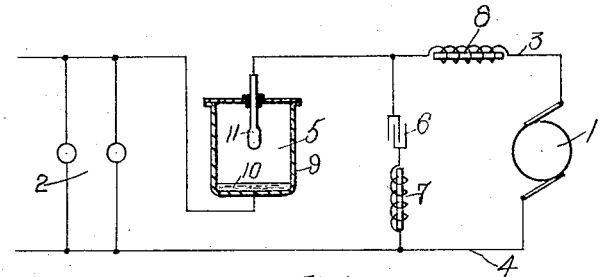
Figure 2:
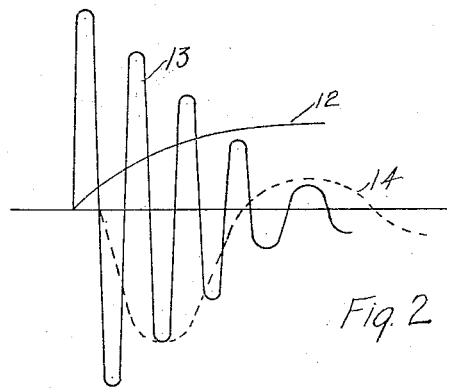

Figure 1 of the accompanying drawings is a diagrammatic view of circuits and apparatus embodying my invention, and Fig. 2 is a diagram embodying a plurality of curves showing the relation of the currents during the operation of my invention.

A direct-current generator 1 supplies current to a load 2 through conductors 3 and 4. A mercury-vapor device 5 is connected in series with the conductor 3, and a condenser 6 and a reactor 7 are connected in series with each other and in shunt relation to the generator 1, substantially as shown. A reactor 8 is connected in series relation to the conductor 3, for reasons hereinafter set forth.

The mercury-vapor device 5 comprises a metal container 9 having a body of mercury 10 which serves as an electrode, and an electrode 11. In order to supply the load 2 with power from the generator 1, an arc must be established in the device 5 by some starting means (not shown) which will effect a high-voltage discharge from the anode to the cathode. The condenser 6 and the reactor 7 are so proportioned that, when the voltage upon the circuit is quickly changed by a short circuit or a surge, the condenser 6 will be charged and will induce, or set up, an oscillating voltage in the conductors 3 and 4 when it discharges.

The curve 12 shown in Fig. 2 of the drawing indicates the growth or increase of a current in a circuit when the resistance or voltage changes. The curve 13 indicates the oscillations of the condenser 6 when the same is discharging, and the curve 14 indicates the dissipation of the energy in the circuit comprising the generator 1, the reactor 8, the condenser 6 and the reactor 7. If a short circuit occurs upon the lines 3 and 4 to cause the current in the same to increase as shown by the curve 12, the voltage across the conductors 3 and 4 will be changed, thus causing the condenser 6 to be charged. The charging and consequent discharging of the condenser 6 will produce an oscillating voltage, substantially as shown by the curve 13, which will tend to increase the current flowing through the mercury vapor device 5 during the first half wave of the oscillation. However, during the second half wave of the oscillation it reduces the resultant current in the mercury vapor device 5 to zero, since the resultant current is the algebraic sums of the two currents flowing. Since the current in a mercury-vapor device cannot reverse its direction, as is known by those versed in the art, the arc will be extinguished, and the circuit will be interrupted.

The circuit comprising the generator 1, reactor 8, condenser 6 and reactor 7 will have a circulating current therein by reason of the oscillation of the discharge from the condenser 6. However, if the reactors 7 and 8 are proportioned correctly, the energy of the circulating current will be quickly dissipated, as is shown by the curve 14.

My invention is not limited to any specific structure or to the arrangement of cir-

I claim as my invention:

1. In an electrical circuit, the combination with a mercury-vapor device, of means for impressing an oscillating voltage upon said mercury-vapor device when the current traversing the circuit exceeds a predetermined value to thereby interrupt the circuit.

2. In an electrical circuit, the combination with a mercury-vapor device connected in series with the circuit, of means for impressing an oscillating voltage upon the said mercury-vapor device when the current traversing the same exceeds a predetermined value only.

3. In an electrical circuit, the combination with a mercury-vapor device connected in series with the circuit, of electrical means connected in parallel relation to said circuit for inducing a high-frequency oscillating voltage in said circuit when the potential of the circuit quickly changes because of a short circuit or a ground thereon only.

4. In an electrical circuit, the combination with a mercury-vapor device connected in series with the circuit, of electrical means connected in parallel relation to said circuit for automatically inducing a high-frequency oscillating voltage in said circuit to extinguish the arc of the mercury-vapor device when an overload traverses the circuit, and means for dissipating the oscillating current thus set up.

5. In an electrical circuit, the combination with a mercury-vapor device connected in series with the circuit, of an electrical means connected in parallel relation to the circuit for interrupting the current traversing the said mercury-vapor device when a short circuit or ground occurs upon the circuit.

6. In an electrical circuit, the combination with a vacuum-electric apparatus, of means for impressing an oscillating voltage upon the said apparatus when the current traversing the circuit exceeds a predetermined value to thereby interrupt the circuit.

7. A method of interrupting an electrical circuit, when the potential thereof suddenly decreases because of an overload thereon, which consists of interrupting the current flowing through a mercury-vapor device connected in the said circuit by impressing a high-frequency oscillating voltage upon the said circuit.

8. In an electrical circuit, the combination with a source of direct current and an electrical load, of a mercury-vapor device, and means for extinguishing the mercury arc of the mercury-vapor device when the voltage changes suddenly upon the said circuit because of a ground or a short circuit only.

9. In an electrical circuit, the combination with a vapor valve connected in series with the circuit, of electrical means connected in parallel relation to the circuit for inducing a high-frequency oscillating voltage in the said circuit to quickly extinguish the arc in the vapor valve when the voltage across the circuit changes quickly.

10. The method of interrupting an electric circuit, when an overload traverses the same, which consists of impressing an oscillating voltage on a vapor valve that is connected in the circuit to thereby extinguish the arc thereof.

11. In an electrical circuit, the combination with a vapor valve connected in series with the circuit, of an impedance device connected in shunt relation to the vapor valve and so proportioned that a high-frequency oscillation is set up to extinguish the arc of the vapor valve when the potential of the circuit changes because of a ground or short circuit thereon.

12. In an electrical circuit, the combination with a vapor valve connected in series with the circuit, of a condenser connected in shunt relation to the vapor valve and so proportioned that it discharges to set up a sufficiently high-potential oscillation to extinguish the arc of the vapor valve when the potential of the circuit changes quickly because of a ground or a short circuit thereon.

13. In an electrical circuit, the combination with a vacuum-electric apparatus, of means for impressing an oscillating voltage upon the said apparatus when the current traversing the same exceeds a predetermined value.

14. In an electrical circuit, the combination with a vacuum-electric apparatus, of means for impressing an oscillating voltage upon the said apparatus when the potential of the circuit quickly changes because of abnormal conditions on the circuit.

In testimony whereof, I have hereunto subscribed my name this 1st day of July, 1914.

CHARLES LE G. FORTESCUE.

Witnesses:
GEO. G. CROWELL,
B. B. HINES.